United States Patent [19]

Lloyd

[11] Patent Number: 5,606,337
[45] Date of Patent: Feb. 25, 1997

[54] VEHICLE TURN SIGNAL AND/OR HAZARD LIGHT DISPLAY

[76] Inventor: Mancelle R. Lloyd, 6111 Briarview Ct., Alexandria, Va. 22310

[21] Appl. No.: 284,233

[22] Filed: Aug. 2, 1994

[51] Int. Cl.$^6$ ................................................ G09G 5/00
[52] U.S. Cl. .................. 345/7; 359/13; 313/578
[58] Field of Search .................. 345/7, 8, 9; 359/13, 359/630, 631, 632, 633; 362/80.1; 313/580, 578, 113, 115; 340/461, 980, 475, 432

[56] References Cited

U.S. PATENT DOCUMENTS

| | | | |
|---|---|---|---|
| H1,109 | 10/1992 | Roberts et al. | 345/7 |
| 2,579,806 | 6/1949 | Dvorkin . | |
| 2,641,159 | 6/1953 | Mihalakis . | |
| 3,325,666 | 7/1964 | Bird et al. | 313/578 |
| 3,887,273 | 6/1975 | Griffiths | 353/14 |
| 3,899,241 | 8/1975 | Malobicky, Jr. et al. | 359/630 |
| 4,740,780 | 4/1988 | Brown et al. | 345/7 |
| 4,806,904 | 2/1989 | Watanuki | 345/7 |
| 5,270,609 | 12/1993 | Smith et al. | 313/578 |

FOREIGN PATENT DOCUMENTS

WO88/05176  7/1988  WIPO ..................................... 359/13

Primary Examiner—Mark R. Powell
Assistant Examiner—Matthew Luu
Attorney, Agent, or Firm—Diller, Ramik & Wight, PC

[57] ABSTRACT

A vehicle turn signal and/or hazard light display is created by utilizing a pair of lamps mounted upon in or on the dash top cowl of a vehicle. The bulbs of each lamp include a filament having a V-shaped portion which, upon electrical energization of the filament, becomes incandescent and a like V-shaped light display is projected from the lamps toward and impinges upon the vehicle windshield and is thereat visible to the driver. The V-shaped portions of the lamp filaments are oriented to point "left" and "right," and thus when appropriately connected to the turn signal circuit, will display "left" and "right" signals upon the windshield, or both "left" and "right" signals simultaneously which is the universal "hazard" signal. Since vehicle windshields are multi-ply, the leftward and rightward pointing "V-shaped" displays are visible in pairs.

15 Claims, 3 Drawing Sheets

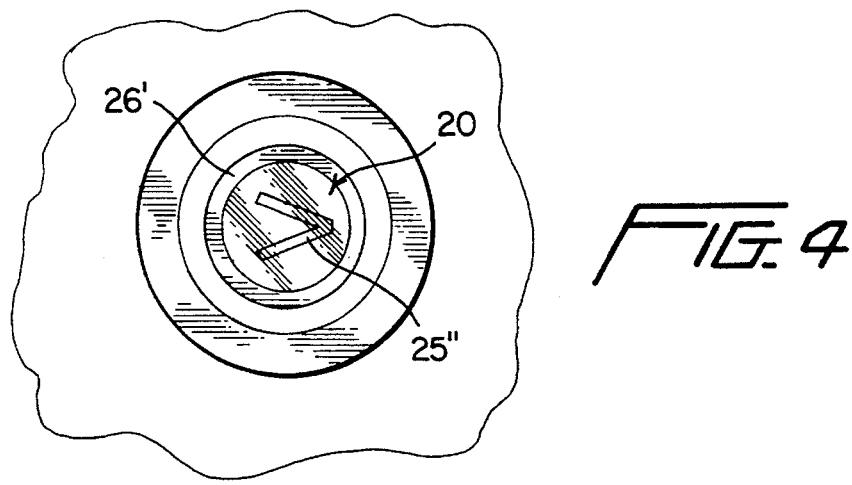
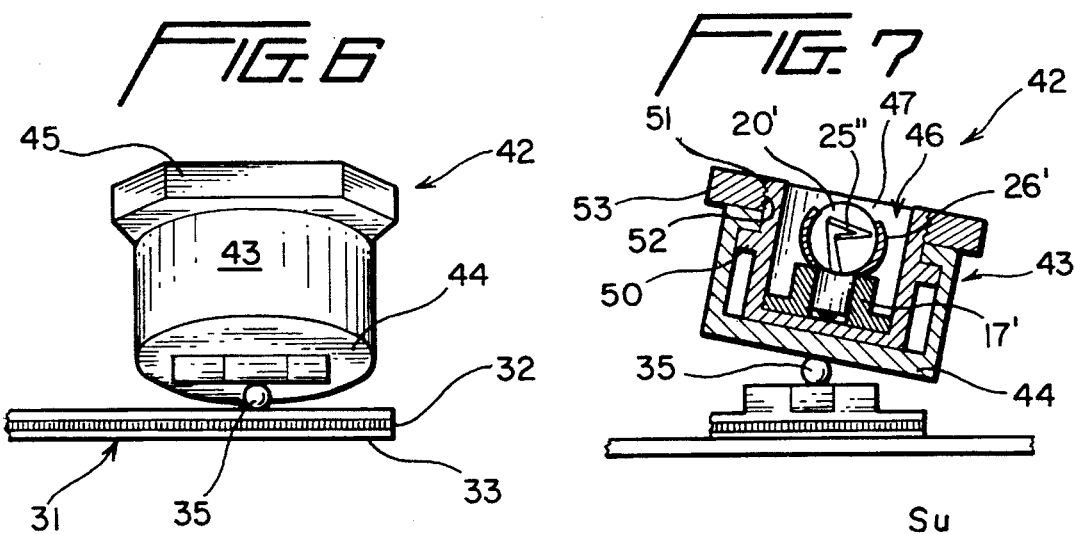
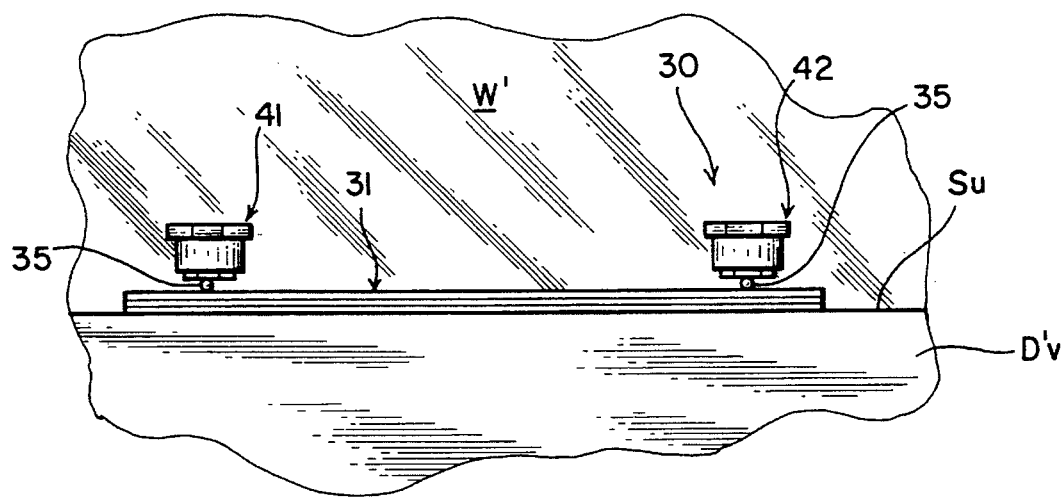

VEHICLE TURN SIGNAL AND/OR HAZARD LIGHT DISPLAY

BACKGROUND OF THE INVENTION

The present invention is directed to a vehicle turn signal and/or hazard light display which appears on the windshield of a motor vehicle to provide the driver thereof with a readily observable display, both day and night, under typical driving conditions, as broadly disclosed in Disclosure Document No. 350,602 of Mar. 21, 1994. Whether being utilized as a turn signal indicator or as a hazard indicator, since the display appears on the windshield of the automobile, and since the location is generally in the viewing area of the driver, the driver will at all times be aware of either the hazard lights or the turn signals being on, as operation dictates. This avoids problems attendant to drivers being oblivious to a turn signal which may, obviously, be displayed to a following vehicle. This can be extremely hazardous because, for example, the driver of a following vehicle seeing a "left" turn signal being displayed may, for example, try to pass the vehicle on the right assuming, of course, both vehicles are in the center lane of a divided six lane highway. If the driver of the front vehicle is unaware of the left "blinker" being on, he might simply decide to abruptly change lanes, turn to the right and accidentally collide with the vehicle attempting to pass. Thus, a driver oblivious to a turn signal being "on" is a hazard on the road, and this is reflected by the 1991 *Virginia Traffic Crash Facts* survey of the Virginia Department of Motor Vehicles which reported that in 1991 there were 938 persons killed, 70,899 injured and 122,516 crashes, most of which were driver created. Such collisions include improper passing (1,876 incidents), failure to yield (23,799 incidents), inattention (26,018 incidents), improper turns (4,008 incidents), improper lane change (1,994 incidents), lights not on (167 incidents), avoiding other vehicle (4,028 incidents), etc. Though none of these driver-created collisions are reported in the survey as being directly related to the presence or absence of vehicle turn signal displays or hazard light displays, obviously, many accidents are associated therewith. Therefore, the present invention seeks to eliminate accidents involved with the inadvertent display of turn signal lights or hazard display lights by the driver of a vehicle who through inattention or otherwise is simply unaware of such facts and directly or indirectly causes a vehicle collision because of the same.

Typical prior art associated with display devices of the type to which this invention is directed is reflected in U.S. Pat. No. 2,579,806 in the name of Harry Dvorkin granted on Dec. 25, 1951 and entitled Projecting Speed Indicator. Essentially, a take-off shaft from the speedometer shaft rotates a transparent member upon which are symbols identical to the symbols on the speedometer. An electric light bulb projects the symbols upon the windshield of the automobile at which the speed can be viewed by the driver who can act accordingly.

In U.S. Pat. No. 2,641,159 granted on Jun. 9, 1953 to Agis Mihalakis, a lens system projects a desired image upon a reflecting screen applied to a windshield surface, such as the speed of the vehicle. Obviously, the driver of the vehicle can view the speed, for example, of the vehicle projected upon the reflecting screen of the windshield and act accordingly.

In U.S. Pat. No. 3,887,273 granted on Jun. 3, 1975 to David Griffiths, a system is provided for projecting a speedometer or other instrument reading as a virtual image upon the windshield of an automobile. The dashboard of the automobile houses a housing in which is supported a reticle consisting of a dial or scale from the speedometer or other instrument gauge. By illuminating the reticle and utilizing an associated optical projection system, the windshield functions as not only the window for the driving environment, but also a projecting screen surface. Basically, lenses of the system prevent aberration so that whatever might be projected can be read upon the windshield by the driver.

U.S. Pat. No. 3,899,241 granted on Aug. 12, 1975 to Rudolph L. Malobicky, Jr. et al. is directed to a windshield provided with a transparent reflective coating on its inboard surface which forms a visual image receiving area onto which can be projected appropriate information from an associated projector. The specifics of the projector are not disclosed in this patent.

U.S. Pat. No. 4,740,780 granted on Apr. 26, 1988 to Steven E. Brown et al. is another example of a so-called head-up display for displaying instrumentation information upon the windshield of a vehicle, such as an automobile, boat or other craft. One suggested format for such a head-up display in this patent is the use of a CRT as the image source, though this is considered impractical and led the inventors to the use of a high output light-emitting diode or array. The latter projects to the windshield dashboard instrument information which is instantaneously and readily available to the driver of the automobile.

In Invention Registration No. H1109 published on Oct. 6, 1992 in the name of John K. Roberts et al. information, including turn signal information, is projected as a "heads-up" display upon the windshield of a vehicle at which it is readily observable by the operator/driver. An indicator needle is rotatably mounted with respect to an analog display and the latter is lit in such a fashion that the information is directed upon a sheet applied to the windshield upon which it is viewable by the driver/operator.

The foregoing patents are reflective of the status of related art and particularly the complexity and expense of the various devices, not to mention the difficulty of the installation thereof.

SUMMARY OF THE INVENTION

In keeping with the foregoing, a primary object of the present invention is to provide a novel vehicle light display for displaying a light display upon the windshield of a vehicle to indicate that one or the other of the turn signal lights or the hazard light is "on." In this way a driver concentrating upon road conditions by viewing through the vehicle windshield cannot but help "see" an indication of an intent to make a turn when such is not desired or a hazard light display when such is also undesired. In this fashion, a driver will not maintain an undesired or inappropriate turn signal and/or hazard light signal lit to the annoyance and/or safety of following or on-coming vehicles, thereby precluding subsequent collisions.

The present invention provides a novel vehicle light display through the utilization of a pair of lamps mounted relative to an associated dashboard of a vehicle and so oriented as to direct light from each of the pair of lamps upon a windshield of a vehicle. The bulbs of each lamp includes a filament, and each filament preferably includes a V-shaped portion which, upon electrical energization of the filament, causes incandescence and a like V-shaped light display which projects toward and impinges upon the vehicle windshield and is thereat visible to the driver. Preferably, the lamps are oriented with the V-shaped filament portions and, thus, the light displays thereof substantially oppositely horizontally directed. Thus, as viewed by the driver, one of the V-shaped displays associated with the left-turn signal points to the left and one of the V-shaped light displays associated with the right turn signal points to the right. Since the invention is associated with shatter-proof or laminated vehicle front windshields, the light displays upon the windshields are actually depicted in pairs of V-shaped light displays associated with each V-shaped filament portion by virtue of the fact that the projected light impinges upon and is reflected by one ply of the windshield, passes refractingly through an intermediate ply of the windshield, and is then reflected from the second ply of the windshield, thereby resulting in a pair of V-shaped light displays associated with each light or lamp filament. Hence, the driver or operator of the vehicle will see a pair of horizontally oriented V-shaped light displays pointing to the left and/or a pair of horizontally oriented V-shaped light displays pointing to the right. Obviously, in the case of the left turn signal light being "on," the pair of left pointing V-shaped light displays will blink and in the case of the right turn signal being "on" the pair of right V-shaped light displays will blink, each on the windshield at which they are observable by the driver. When the hazard light switch is "on," both the left pointing and right pointing horizontally oriented pairs of light displays will simultaneously blink upon the windshield in clear view to the driver thereof. Therefore, in each of these cases, the driver/operator of the vehicle will be "reminded" of the status of his or her turn signals or hazard signals and can act appropriately to reduce/eliminate vehicle collisions.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 4 is a fragmentary top plan view generally along line 4—4 of FIG. 2, and more clearly illustrates the V-shaped filament portion of a filament of one of the lamps of FIG. 3.

FIG. 5 is front elevational view of another vehicle turn signal and/or hazard light display of the present invention, and illustrates two lamp holding members universally mounted upon a supporting base which is supported movably upon the dashboard of an automobile adjacent the windshield thereof.

FIG. 6 is a front perspective view of a holder for one of the lamps of the display of FIG. 5, and illustrates a universal mounting of the holder.

FIG. 7 is an axial cross-sectional view through the holder of FIG. 6, and illustrates details thereof, including a filament of a lamp having a V-shaped filament portion.

DESCRIPTION OF THE PREFERRED EMBODIMENT

Figure 1:
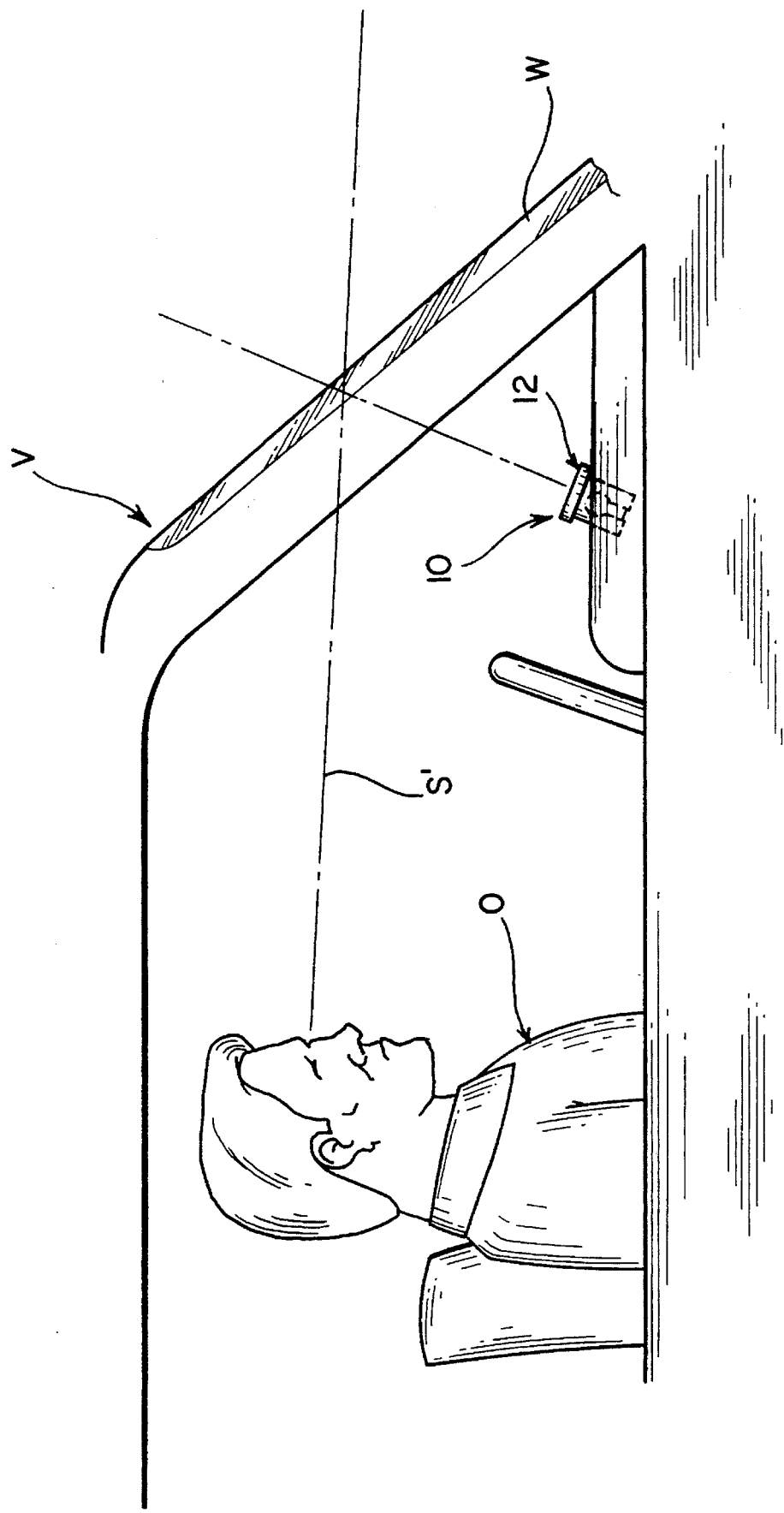
FIG. 1 is a side elevational view of a motor vehicle, and illustrates one of a pair of lamps projecting a turn signal display or a pair of hazard light signal displays upon a laminated/shatterproof windshield of a conventional vehicle at an area contiguous the sight line of an operator or driver of the vehicle.
Figure 3:
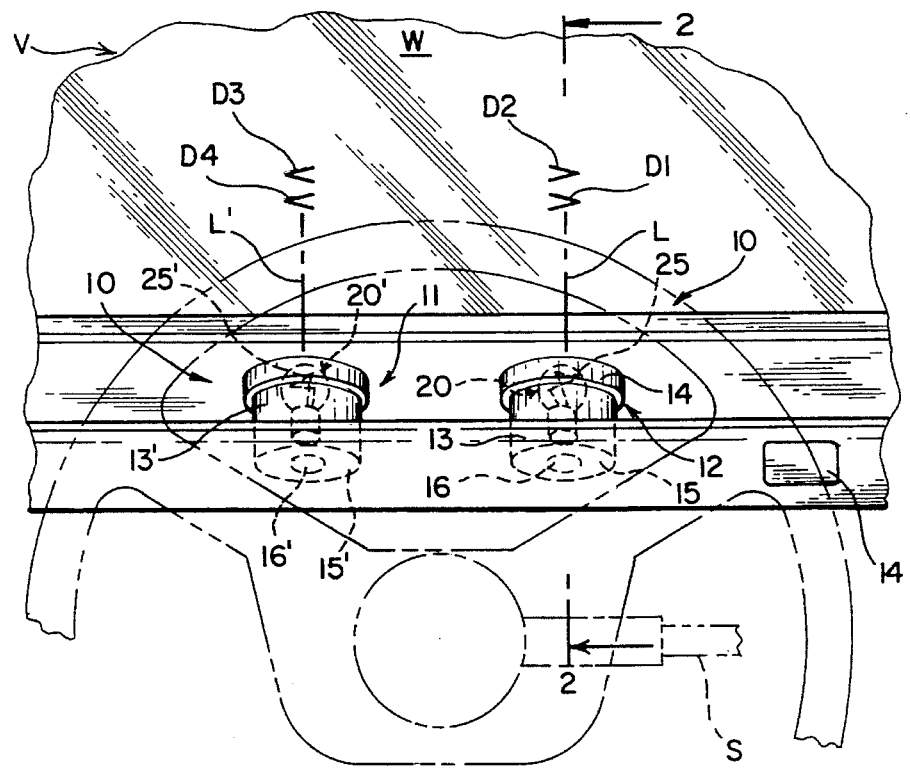
FIG. 3 is a fragmentary elevational view looking from left-to-right in FIG. 2, and illustrates two lamps carried by the vehicle dashboard and the V-shaped portions of the filaments thereof directed oppositely relative to one another which when energized by a suitable 12-volt source of electricity renders the filaments incandescent and projects upon the laminated windshield two generally horizontally oriented V-shaped light displays pointing to the left and two identical V-shaped light displays pointed to the right when the lamps are connected to a conventional hazard switch of the vehicle when it is in the "on" position.

A novel vehicle turn signal and/or hazard light display or display mechanism of the present invention is generally designated by the reference numeral 10 (FIGS. 1 and 3), and includes a pair of identical lamp or lamp bulb holders 11, 12 (FIG. 3). Since the lamp bulb holders 11, 12 are identical, the following description of the lamp bulb holder 12 is equally applicable to the lamp bulb holder 11.

Figure 2:
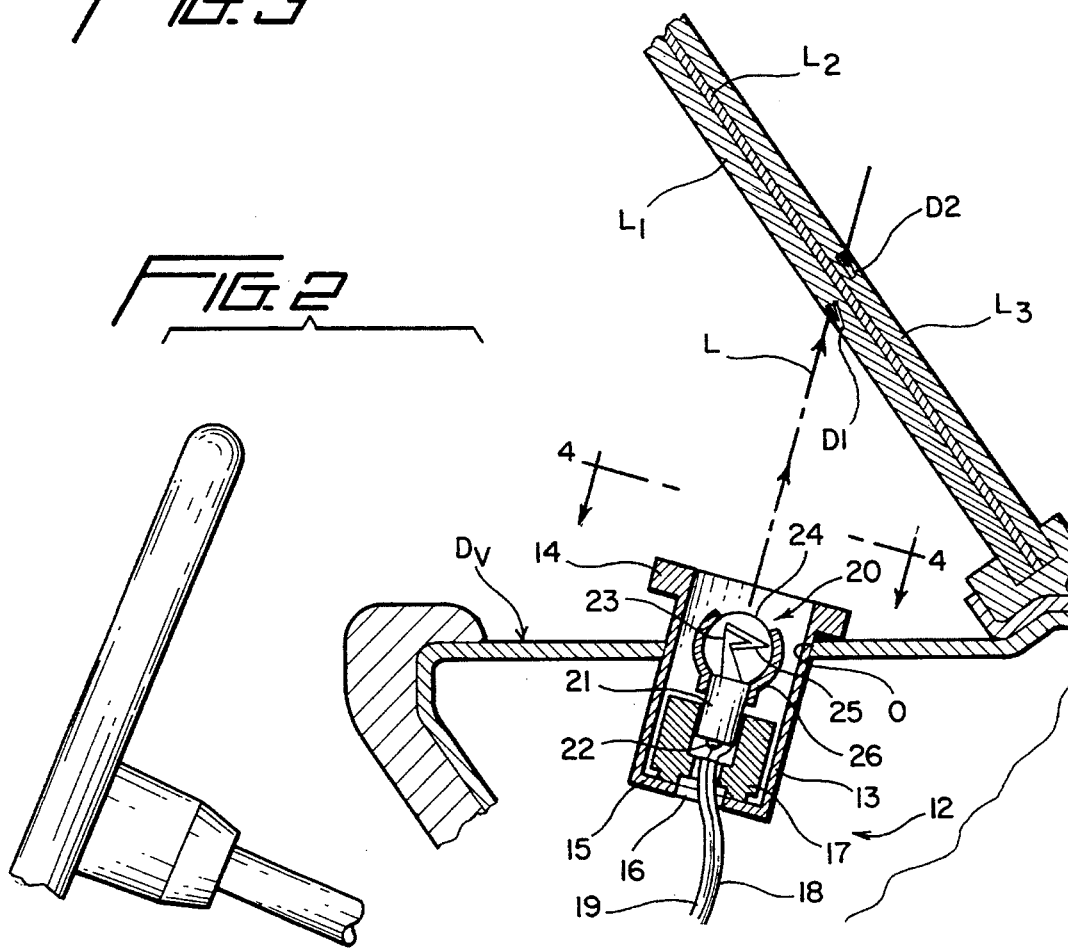
FIG. 2 is a fragmentary enlarged cross-sectional view taken generally along line 2—2 of FIG. 1 through the vehicle in an area of the dashboard and windshield thereof, and illustrates one of a pair of lamps, its filament and an associated V-shaped filament portion thereof and a pair of V-shaped light displays project upon inner and outer glass panes of a laminated windshield of the vehicle.

The lamp bulb holder 12 (FIG. 2) includes a cylindrical housing 13 having a radially outwardly directed peripheral wall 14 and a circular bottom wall 15 provided with a circular opening 16. A conventional lamp or light socket 17 is housed within the housing 13 and includes a pair of wires 18, 19 which are sufficiently long to be connected to the wires (not shown) of the hazard lamps (not shown) and the turn signal lamps (also not shown) of an associated vehicle V which are conventionally controlled by a conventional turn signal switch S and a hazard signal switch H (FIG. 3) of the vehicle V. A lamp or light 20 is best shown in FIGS. 2 and 4 in its normal position within the socket 17 such that a cylindrical conductive body 21 and an axial conductor 22 are in electrical conductivity with the wires 18, 19 and, of course, are also in electrical conductivity with a filament 23 of the lamp 20 having a generally V-shaped filament portion 25 with both the filament 23 and the V-shaped filament portion 25 being housed within a glass bulb 24 of the lamp 20. A sleeve 26 of opaque (black) plastic material partially surrounds the lamp to reduce peripheral glare and direct light from the lamp 20 generally along the line L which projects toward and impinges upon a shatterproof laminated windshield W of the vehicle V. The lamp 20 is preferably a G.E. T1445 or T1446, 12–14 volts, 4–4.5 watts or equivalent manufactured by other vendors in which the V-shaped filament portion 25 is essentially disposed in a plane normal to the axis (unnumbered) of the metal body 21 or is essentially normal to the line L. Thus, when electric current is conducted through the conductors or wires 18, 19, and the filament 23 becomes incandescent, the V-shaped filament portion 25 becomes incandescent creating an incandescent V-shaped light display which projects along the line L and impinges upon a laminate L1 of the windshield W which also includes a central laminate L2 and an outer laminate L3 typical of so-called shatterproof windshields. The light projected along the line L projects the incandescent V-shaped light upon the laminate L1 as a V-shaped light display D1, and as a part of the light refracts through the laminate L2, another V-shaped light display D2 is formed on the windshield L3. Thus, the two V-shaped light displays D1, D2 and D3, D4 (FIG. 3) are identical in shape and configuration to the V-shaped filament end portions 25 and are offset from each other, as is best indicated in FIG. 3. Since the V-shaped filament portion 25 lies in a plane essentially normal or transverse to the axis of the cylinder 21 which is essentially depicted by the line L, the V-shaped light displays D1, D2 lie generally in a horizontal plane and, of course, point to the right, also as viewed in FIG. 3, because the V-shaped filament portion 25 of the lamp 20 also points to the right, as is best shown in FIG. 3. In the case of the lamp bulb holder 11, the corresponding lamp 20' (FIG. 3) thereof includes a V-shaped filament portion 25' which points to the left and is normal or transverse to the line L' corresponding to the line L of the lamp 20. Thus, the V-shaped light displays D3, D4 are also formed on the respective laminated L1, L3 of the windshield W, and though the same are generally horizontally disposed, they point to the left, as viewed in FIG. 3. Obviously, the lamp 20' is in the circuit of the left-hand turn signal switch S, whereas the lamp 20 is in the circuit of the right-hand turn signal switch S and both lamps 20, 20' are in the circuit of the hazard signal switch H.

The V-shaped light displays D1, D2 are spaced from the V-shaped light displays D3, D4 by approximately seven (7) inches. The position of the light displays D1–D4 upon the windshield W is readily and easily determined by viewing along the low beam sight line which for most automobiles is approximately 32'–36' distance from the vehicle headlights. For example, in FIG. 1 the occupant O is viewing along the sight line S', and this sight line S' is the sight line of the low beams of the vehicle. Thus, the position of the light displays D–D4 can be readily established for virtually any vehicle by locating the lamp bulb holders 11, 12 in or upon the dash cowl at a position at which the light displays D1–D4 will impinge upon the windshield W at the low beam line of sight S'.

In operation, if the right-hand turn signal switch is "on," the lamp 20 is energized, the filament 23 becomes incandescent, as does the V-shaped end portion 25 projecting the V-shaped light display D1 along the line L upon the laminate L1 and the V-shaped light display D2 upon the laminate L3 of the windshield W. Obviously, when the turn signal switch for the lamp 20' is "on," a like incandescence of the filament 23' and the associated V-shaped filament portion 25' projects such image along the line L' which impinges upon and creates the V-shaped light images or displays D3 and D4 upon the respective laminates L1 and L3 of the windshield W. Obviously, all four V-shaped light display images D1–D4 are projected upon and are visible upon the windshield W when the hazard switch is moved to its "on" position. Thus, a driver or operator O (FIG. 1 ) driving the vehicle V and looking through the windshield W along a line of sight S' will see one or both of the pairs of V-shaped light displays D1, D2 and D3, D4 depending upon whether the right-hand turn signal switch S, the left-hand turn signal switch S or the hazard switch H is in its "on" position. Normally whichever switch is "on," the displays D1, D2 and/or D3, D4 will "blink" and/or turn "on" and "off" intermittently in a conventional fashion. Thus, the operator O looking along the line of sight S' (FIG. 1) you will see such intermittent "on"—"off" displays of the pairs of V-shaped light displays and will be reminded that one or the other or both of the pairs of V-shaped light displays D1, D2 and D3, D4 is indicating that the corresponding lamps of the vehicle are also on and operating in a similar manner. Thus, the operator O can act appropriately to, for example, turn the vehicle in an appropriate direction if that was the operator's desire or, of course, turn off the displays by operating the conventional turn signal indicator switch S and/or hazard switch H of the vehicle V when the signal/displays are recognized as being on inadvertently. In this fashion, the driver is continuously reminded as he looks along the sight line S' of the operation of the vehicle's turn signal lamps and/or hazard lamps.

It is to be particularly noted that the direction of the pairs of V-shaped light displays D1, D2 and D3, D4 in FIG. 3 are opposite each other and, of course, "point" respectively to the right and to the left, and this is achieved solely because the respective V-shaped filament portions 25, 25' point respectively right and left. Accordingly, absolutely nothing is required in the way of special optics or any other ancillary elements to not only cause the displays D1, D2 and D3, D4 to appear on the windshield W, but to do so in the proper direction of display to indicate both right hand and left hand turn signal indications. It should be noted that in FIG. 2 the displays D1, D2 appear to be pointed downwardly, and this has been done merely as a matter of convenience of disclosure since it is impossible to illustrate these displays in FIG. 2 in a horizontal orientation, but the same appear as shown in FIG. 3, namely, pointing to the right, whereas the displays D3, D4 point to the left. Thus, by the simple utilization of lamps or bulbs 20, 20' having appropriately configured V-shaped filament end portions 25, 25' , the appropriate displays D1 through D4 are provided upon the windshield W through simplicity of structure, installation and operation. As evidence of the latter, each of the cylindrical housings 13 is simply inserted into an opening O of a dashboard Dv of the vehicle at a point at which the displays D1, D2 and D3, D4 will focus accurately and clearly upon the windshield W. The positions of the openings O are determined by the particular vehicle V and specifically the windshield W thereof which can vary in total thickness, thickness of the various laminates L1 through L3 and/or a curvature. However, by utilizing a single standard lamp or bulb 20 or 20', such as the G.E. T1445 or T1446 or an equivalent thereof, specifications can be provided which would allow even a novice to cut the requisite openings O in virtually any dashboard Dv of virtually any vehicle V to accurately locate the position of each cylindrical housing 13 and thus achieve light projection along the projection lines L, L' to assure self-focused images D1, D2 and D3, D4, respectively, upon the windshield W. Obviously, the direction of the V-shaped light displays D1–D4 is also assured in a relatively simple and straightforward manner, namely, orienting/rotating the lamp bulb holders 11, 12 such that the sockets 17 assure that upon the metal cylindrical bodies 21 being inserted therein by screw or bayonet connection, the V-shaped filament end portions 25, 25' will point appropriately to the left for the lamp bulb holder 11 and to the right for the lamp bulb holder 12.

While the vehicle light display or display mechanism 10 of FIGS. 1 through 4 is particularly adapted for both factory installation and after market installation, one might find prohibitive or undesirable the formation of openings O in the dashboard Dv. Accordingly, reference to another vehicle light display or display mechanism 30 is shown in FIG. 5 mounted upon an upper surface Su of a vehicle dashboard D'v which includes a windshield W' corresponding to the multi-laminated windshield W of FIG. 2.

The vehicle light display mechanism or device 30 includes a mounting base or support 31 which functions as means for mounting the vehicle light display 30 upon the upper support surface Su of the vehicle dashboard D'v. The mounting means 31 is preferably an elongated plate 32 which on its undersurface (unnumbered) carries a magnet, velcro and/or anti-friction means 33 which permits the support means 31 to rest upon the surface Su in a generally immobilized manner irrespective of the particular material from which the surface Su is constructed.

A universal joint 35 of a conventional construction is associated with each of a pair of identically constructed lamp or lamp bulb holders 41, 42 of which the lamp bulb holder 42 is fully illustrated in FIG. 7 of the drawings. Since the lamp bulb holders 41, 42 are identical, the following description of the lamp bulb holder 42 will apply equally to the lamp bulb holder 41. The lamp bulb holder 42 includes a cylindrical housing 43 having a bottom circular wall 44 and a radially inwardly directed flange 45. A rotating holder 46 is formed by another cylindrical body 47 opened at its top and having a circular bottom wall 48 and an outwardly projecting peripheral flange 50. The flange 50 can be forced past the flange 45 with the flanges 45, 50 deflecting to allow such passage to permit the assembly of the rotatable housing 46 within the holder 43. External threads 51 of the housing 46 mesh with internal threads 52 of a clamping ring 53 such that upon tightening of the clamping ring 53, the flange 50 is essentially pulled upwardly, as viewed in FIG. 7, toward the clamping ring 53 to clamp against the flange 45 and prevent rotation of the rotating holder 46. Thus, prior to such clamping by the clamping ring 53, the holder 46 is rotated to a position at which a V-shaped end portion 25" of a lamp 20' is properly oriented to point to the right. Tightening the clamping ring 53 will lock the holder 46 and the holder 17' in this (or any) desired position of rotation. Thus, the housing 47 of the lamp holder 42 would be rotated to point to the right and then locked by the clamping ring 53, whereas the corresponding housing of the lamp holder 41 would be turned to point the filament (not shown) to the left before the clamping ring of the holder 41 is tightened to its locked position. This would ensure that the displays (not shown) appearing upon the windshield W' would point opposite one another, just as the respective displays D1, D2 and D3, D4. In this case, the mounting means 31 allows the overall vehicle light display 30 to be positioned virtually anywhere upon a surface Su of the dashboard D'v of virtually any vehicle and moved toward or away from the windshield W' to achieve appropriate focusing in conjunction with pivoting about the universal joints 35 to achieve orientation of the V-shaped filament end portions 25" of the holders 41, 42.

Although a preferred embodiment of the invention has been specifically illustrated and described herein, it is to be understood that minor variations may be made in the apparatus without departing from the spirit and scope of the invention, as defined the appended claims.

I claim:

1. A vehicle light display comprising a pair of lamps, each lamp having a filament, each filament having a portion which is rendered incandescet upon being energized by an electric current, each filament portion being of a predetermined configurtion, means for mounting said pair of lamps adjacent a vehicle windshield whereby the light of each incandescent filament portion is projected toward and is replicated as a light display thereupon upon electric current energization of each filament, each filament portion being of a generally V-shaped configuration which creates a generally V-shaped light display, and said mounting means are constructed and arranged for mounting said lamps with said V-shaped filament portions and the light displays thereof being substantially oppositely directed.

2. The vehicle light display as defined in claim 1 wherein said V-shaped filament portions and the light displays thereof are substantially oppositely horizontally directed.

3. The vehicle light display as defined in claim 1 including a vehicle windshield adjacent said pair of lamps upon which is projected the light display of said incandescent filament portions.

4. The vehicle light display as defined in claim 1 including a laminated vehicle windshield adjacent said pair of lamps upon which is projected the light display of said incandescent filament portions whereby the projected light of each incandescent filament portion appears upon said laminated vehicle windshield as at least a pair of like configured light displays.

5. The vehicle light display as defined in claim 2 including a vehicle windshield adjacent said pair of lamps upon which is projected the light display of said incandescent filament portions.

6. The vehicle light display as defined in claim 2 including a vehicle windshield adjacent said pair of lamps upon which is projected the substantially oppositely horizontally directed light displays.

7. The vehicle light display as defined in claim 2 including a laminated vehicle windshield adjacent said pair of lamps upon which is projected the substantially oppositely horizontally directed V-shaped light displays whereby the projected light of said V-shaped incandescent filament portions appear upon said laminated vehicle windshield as at least a pair of like configured substantially oppositely horizontally directed V-shaped light displays.

8. The vehicle light display as defined in claim 4 including means for selectively electrically energizing said lamps to effect one of simultaneous and alternative electrical energization thereof thereby adapting the same to indicate respective hazard and directional turning light displays.

9. The vehicle light display as defined in claim 4 wherein said mounting means removably mount said lamps relative to a vehicle dashboard.

10. The vehicle light display as defined in claim 4 wherein said mounting means removably mount said lamps upon a vehicle dashboard.

11. The vehicle light display as defined in claim 4 wherein said mounting means removably mount said lamps within a vehicle dashboard.

12. The vehicle light display as defined in claim 8 wherein said mounting means removably mount said lamps relative to a vehicle dashboard.

13. The vehicle light display as defined in claim 8 wherein said mounting means removably mount said lamps upon a vehicle dashboard.

14. The vehicle light display as defined in claim 8 wherein said mounting means removably mount said lamps within a vehicle dashboard.

15. A vehicle light display comprising a laminated vehicle windshield and an adjacent Vehicle dashboard, a pair of lamps, each lamp having a filament, each filament having a portion which is rendered incandescent upon being energized by an electric current, each filament portion being of a predetermined configuration, means for mounting said pair of lamps adjacent said laminated vehicle windshield whereby the light of each incandescent filament portion is projected toward and is replicated as a light display thereupon upon electric current energization of each filament, each filament portion being of a generally V-shaped configuration which creates a generally V-shaped light display, and said mounting means being constructed and arranged for mounting said lamps with said V-shaped filament portions and the light displays thereof being substantially oppositely horizontally directed and appearing upon said laminated vehicle windshield as at least a pair of like configured substantially oppositely horizontally directed V-shaped light displays.

* * * * *